Figure 1:
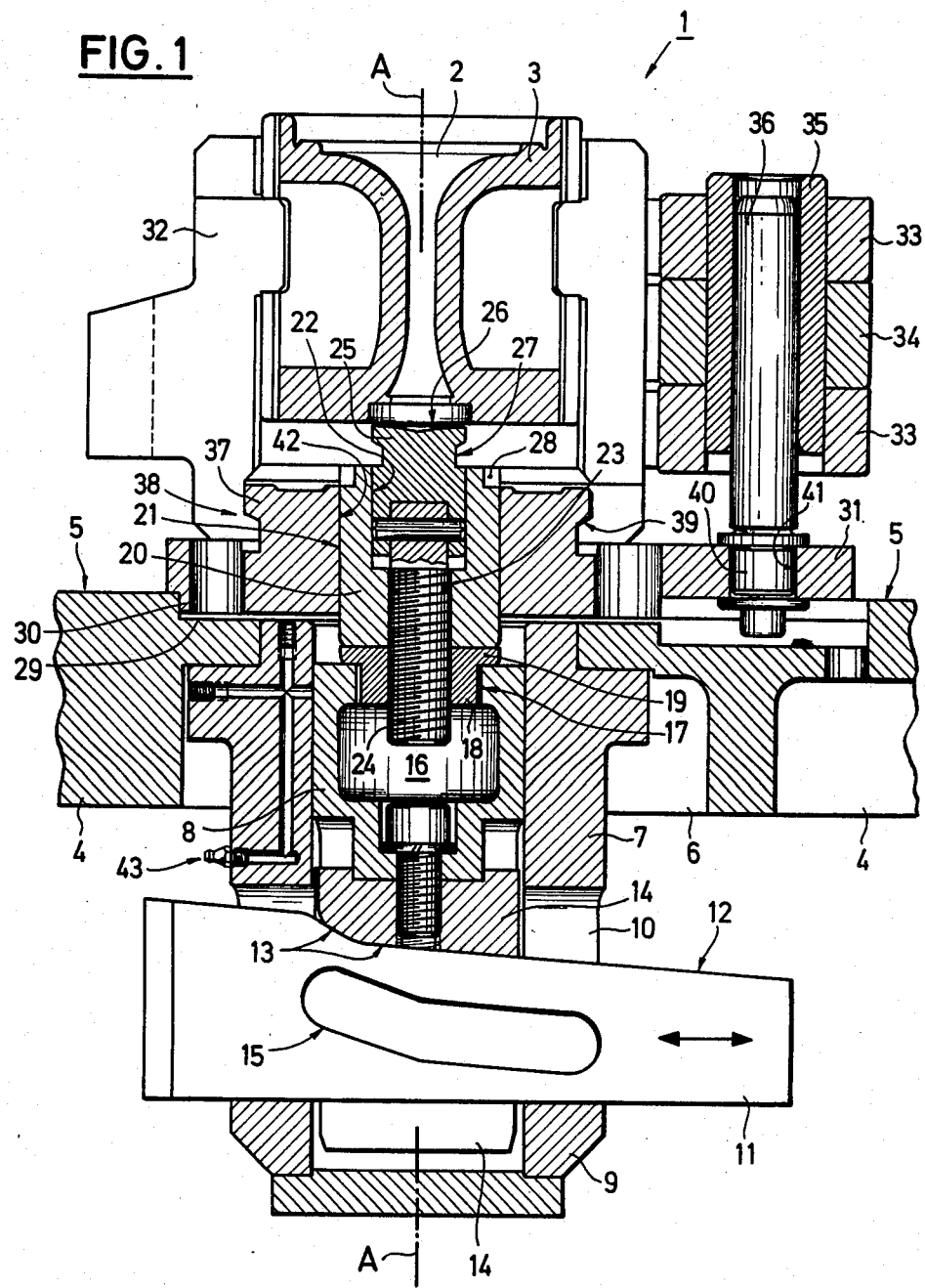

United States Patent [19]

Halbritter

[11] Patent Number: 4,612,033
[45] Date of Patent: Sep. 16, 1986

[54] MACHINE FOR MAKING PRESSED GLASS PARTS

[75] Inventor: Wilfried Halbritter, Lohr am Main, Fed. Rep. of Germany

[73] Assignee: Positron Gesellschaft für Anlagen zur Verformung thermoplastischer Massen mbH, Glattbach, Fed. Rep. of Germany

[21] Appl. No.: 762,130

[22] Filed: Aug. 2, 1985

[30] Foreign Application Priority Data

Aug. 6, 1984 [DE] Fed. Rep. of Germany ....... 3428952

[51] Int. Cl.⁴ ............................................. C03B 11/10
[52] U.S. Cl. ......................................... 65/313; 65/311; 65/321; 65/322; 65/DIG. 10
[58] Field of Search ................. 65/305, 311, 313, 321, 65/322, 323, DIG. 10

[56] References Cited

U.S. PATENT DOCUMENTS

| | | | |
|---|---|---|---|
| 1,143,423 | 6/1915 | Messner et al. | 65/321 X |
| 1,543,725 | 6/1925 | Roe | 65/321 |
| 1,909,374 | 5/1933 | McNamara | 65/321 X |
| 3,071,946 | 1/1963 | Watson et al. | 65/DIG. 10 |

Primary Examiner—Robert Lindsay
Attorney, Agent, or Firm—Felfe & Lynch

[57] ABSTRACT

Machine for making pressed glass parts, and particularly cups and stems. A rotatable machine table (4) has several work stations (1) which have one bottom plate (31) each with a means (37) for centering an exchangeably mountable glass mold (3). Each work station (1) has a lift drive for a rod (25) coacting with the glass mold (3). The lift drive contains a first vertical guidance element (8) mounted in the machine table (4). The rod (25) has a second vertical guidance element (20) mounted in the bottom plate (31). Finally, a means for setting the vertical distance between rod (25) and lift drive is provided. To achieve the object of reducing the overall height and weight of the machine, the first vertical guidance element (8) is over its entire length mounted underneath an upper boundary surface (5) of the machine table (4) inside the latter, and the bottom plate (31) is mounted directly on the machine table (4). By designing the machine in accordance with the invention the hitherto used mold table is dispensed with.

9 Claims, 6 Drawing Figures

MACHINE FOR MAKING PRESSED GLASS PARTS

The present invention relates to a machine for making pressed glass parts with a surface for joining with a further glass part, and more particularly for making cups and stems, with a rotatable table having several stations with one bottom plate each with at least one centering means for an exchangeably mountable mold, with one lift drive each for a rod, said rod coacting with the said mold and forming the said joining surface and being slightly lowerable after the forming, with a first vertical guidance means for the said lift drive mounted together with the latter in the said table and with a thereabove lying second vertical guidance means for said rod mounted in the bottom plate, and with a means for setting the vertical distance between rod and lift drive.

The rod referred to above concerns an adjustable and definedly movable closure means for the mold, which in the making of cups and/or stems gives the subsequent junction points and/or joining surfaces their geometrical form. The rod must, prior to pressing, be raised into its pressing position and in a first phase after the forming of the joining surface withdrawn by a slight, but defined distance from the said joining surface, by about 0.5 mm for example. If this distance is too small the rod will take too much heat from the glass, thus resulting in cracks in the joining surface. If, on the other hand, this distance is too large the still plastic glass will sag through too much and give an imperfect form of joining surface. Ideally, a slight contact will exist of the oncoming mass of glass exclusively with the center of the rod (=adequate support with a negligible dissipation of heat to the rod). It is furthermore necessary to center the rod relative to the glass mold as accurately as possible so as to obtain a perfect joint of the parts in question.

In a forming machine of the kind described known from the prior art the multiple and carousel-like arranged bottom plates with their molds are mounted on so-called mold tables which are firmly joined with the rotatable machine table and define a second working plane on which also the closure drives for the glass molds are disposed. These mold tables are relatively bulky and therefore heavy components with a corresponding extension at the upper end on which the said closure drive is mounted. Due to the large weight of the many mold tables the machine table has to be dimensioned accordingly so that in addition to a comparatively large height a large weight of the machine results. Added to this is the further fact that the lift drives are mounted in the machine table and the rods are carried in the various mold tables so that the forward movement has to be transmitted by lever systems. A lever drive system has to be provided even though the first vertical guidance means and its bearing fastened in the machine table already protrude above the upper boundary surface of the machine table. A large weight of the machine table with the thereon fastened mold tables is, however, of a disadvantage particularly for the reason that the pressing process takes place quasi continually and consequently the said machine table has to be driven intermittently. Because of the large weight of the machine table with its superstructures and the thereby required forces of mass only a limited acceleration and retardation in circumferential direction can be effected so that the device known from the prior art can carry out only a limited number of rhythmic movements.

From DE-GM No. 71 11 060 a glass press is known with which both one-piece glasses (e.g. plates, beakers) and two-piece glasses (e.g. glasses with stems) can be produced. While with this press the bottom plates for the mold are mounted on the machine table directly, there is no rod and neither are there drive means for a stepped drive (of the rod) nor double guides for the movable parts of the lift drive on one hand and of the (not existing) rod on the other. In a variation of the known press for making glass plates the lower closure of the mold is provided by a so-called lifting bottom which during pressing rests on the bottom plate and for the removal of the plate is lifted by a considerable amount. A lowering of the said lifting bottom is not provided for nor can it be provided on account of the bottom plate so that the lifting bottom remains in contact with the plate and thus constitutes a considerable loss of heat. The centering between lifting bottom and glass mold is inaccurate due to the required heat expansion tolerances and not suited for a rod. In a further variation of the known press for assembling stem glasses stem and cup are already preformed and all that is required is to press the cup by means of a raisable support plate, which is neither a rod nor is it carried in the machine table, against the surface of engagement with the stem. The drive and/or lift means should thereat be disposed stationary underneath the machine table so that the movable parts cannot be carried in the said machine table.

It is therefore the object of invention to improve a molding machine of the kind described so that the number and weight of the parts can be drastically reduced and the number of rhythmic cycles per unit of time considerably increased.

The above object is achieved according to the invention in that the first vertical guidance element is mounted over its entire length underneath an upper boundary surface of the machine table and inside the latter and in that the bottom plate with the second vertical guidance element is mounted on the said machine table directly.

By providing the features according to the invention all mold tables with their considerable weights and necessary fastening means are eliminated. The glass molds with their associated holders can thus be fastened at a considerably lesser height directly on the machine table. Furthermore, because of the smaller number and lesser weight of the components now fastened directly on the mold table the machine table can have considerably smaller dimensions, thereby clearly reducing the total weight of the machine once again. By eliminating numerous parts the change-over and dismounting times are reduced with a corresponding reduction of failure incidence. Due to a lesser overall height of the machine the molds can now be mounted at a more accessible height; it is however also possible to utilize the so gained space for greater mold heights, i.e. use the machine for glasses of also larger dimensions. Because of a lower moment of inertia of the rotating parts acceleration and retardation can be increased and thus a higher number of rhythmic cycles achieved. Also the costs of producing such a machine can be considerably lowered.

The fastening of the glass molds and associated holders on the machine table directly was in no way obvious since by reason of the length of the transmission lever system from lift drive to rod and the necessity of a length adjustment of the said transmission lever system correspondingly long vertical guidances had to be provided which protruded from above the mold table and prevented a direct mounting of the bottom plate with the glass mold.

In a further perfection of the invention the first and second vertical guidance elements are, by way of a threaded bushing which is unturnable relative to the first vertical guidance element, mounted upon one another in the area of the machine table, and a threaded bolt which is unturnably joined with the rod but is turnable relative to the second vertical guidance element in a further thread engages in the said threaded bushing, namely so that the second vertical guidance element constitutes the counter nut for the said threaded bushing.

In this way, the two vertical guidance elements designed after the manner of pistons are located practically directly above one another, i.e. the same are separated from one another only by an edge of the said threaded bushing. By the elimination of a special transmission lever system the two vertical guidance elements can furthermore be held to a correspondingly short length, making it thus possible to now accomodate the two vertical guidance elements within an overall height that in the known design would have been required just for the first or lower vertical guidance element alone. Through this rigid connection of the threaded bushing with the first(lower) vertical guidance element it is no longer necessary to hold the said threaded bushing which is no longer readily accessible from outside, while the threaded bolt of the rod and/or the second (upper) vertical guidance element are turned relative to the first (lower) vertical guidance element and/or the threaded bushing for the purpose of adjusting the rod or of countering.

So as to be able to fully bring to bear each vertical guidance element independently of the other the threaded bushing is in a further perfection of the invention inserted with radial play in the first guidance element.

Further perfections of the present invention will become apparent from the other subclaims.

Figure 2:
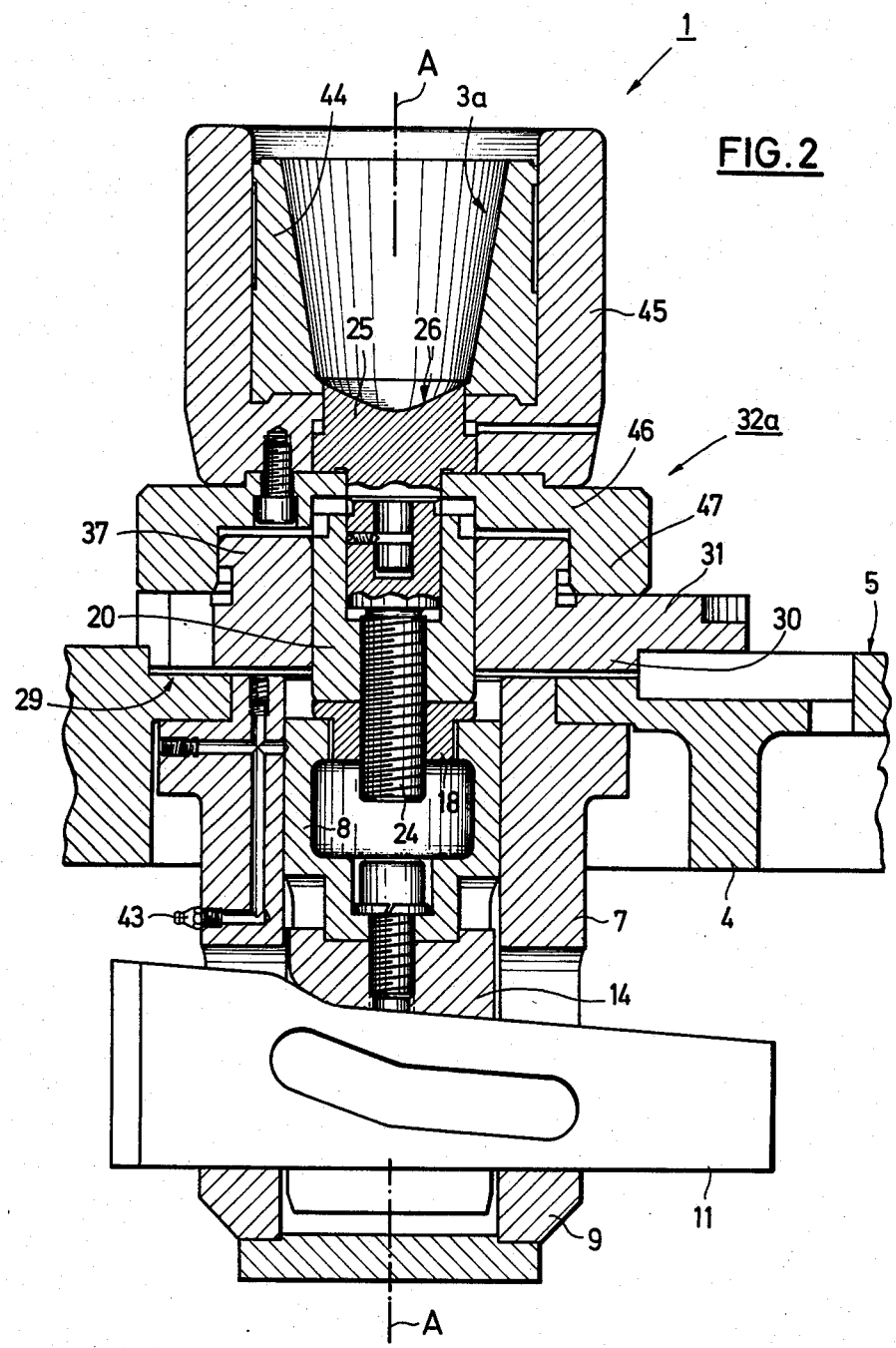
Figure 3:
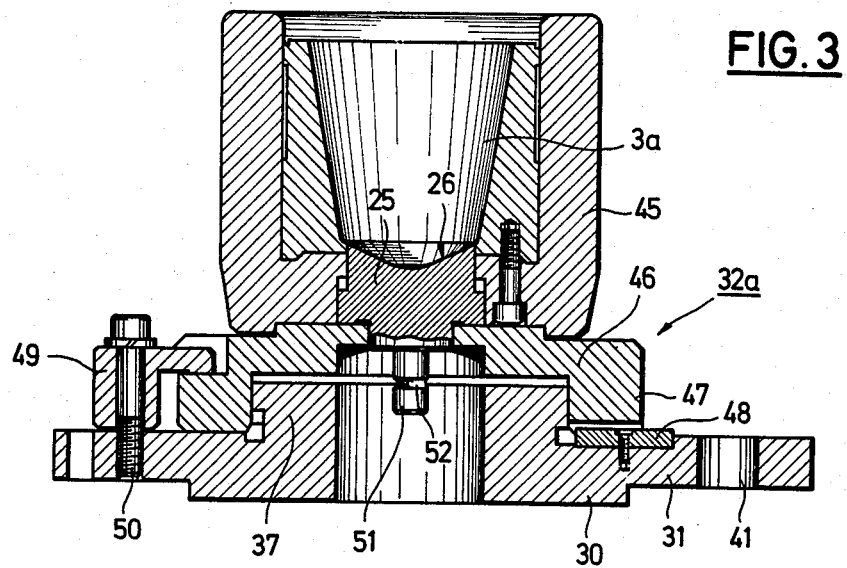
Figure 4:
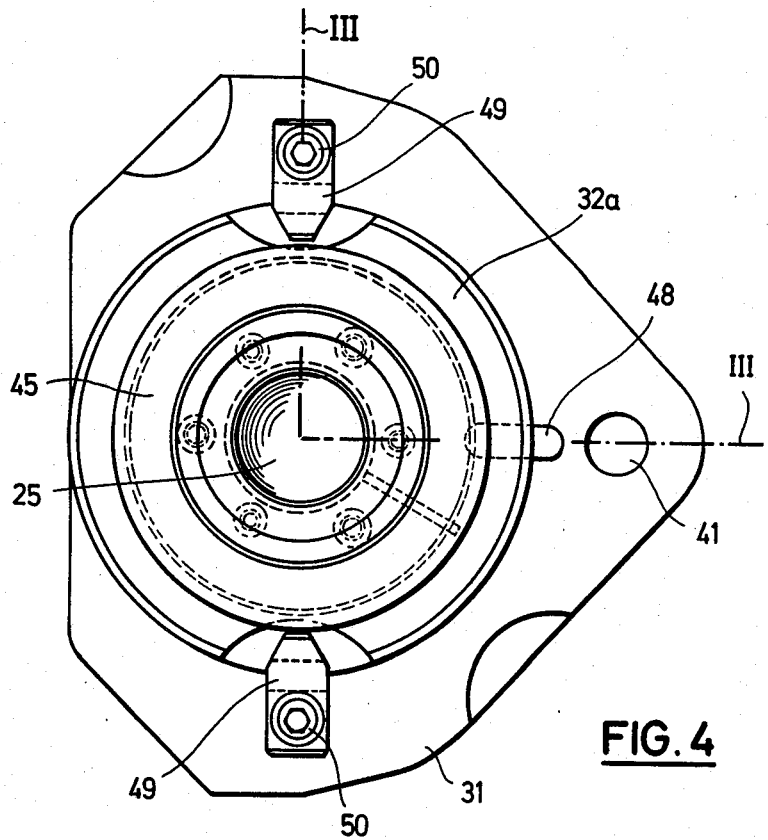
Figure 5:
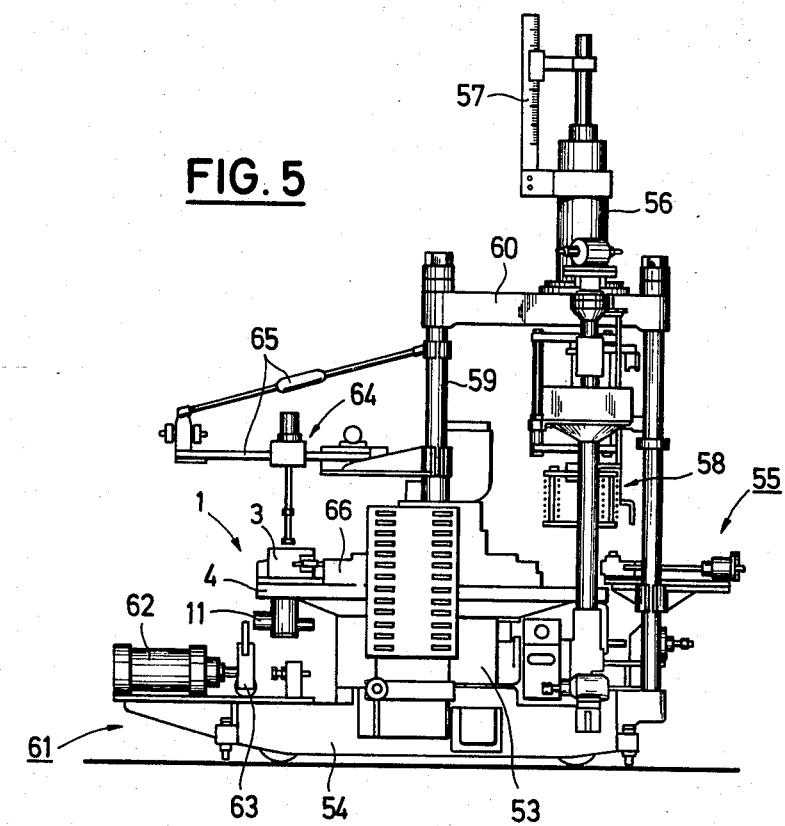
Figure 6:
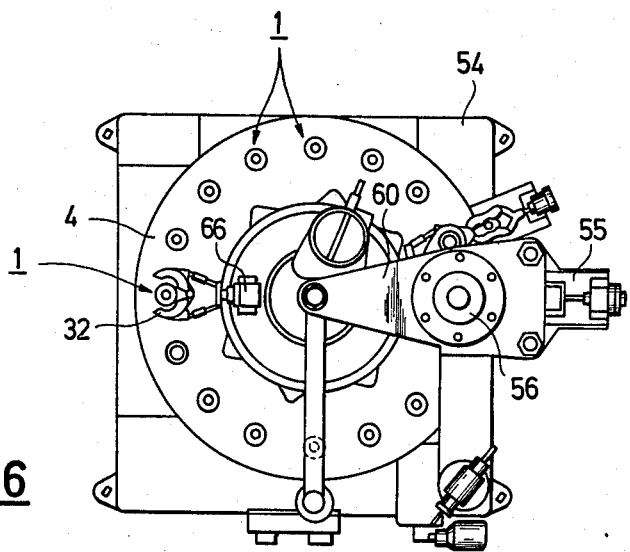

Two embodiments of the invention and details thereof will be explained more fully on hand of the drawings, wherein FIG. 1 shows a vertical section through a station for making stems, FIG. 2 shows a vertical section through a station for making cups, FIG. 3 shows a vertical section through a bottom plate with a thereon mounted mold similar to FIG. 2, FIG. 4 shows a plan view of the bottom plate with a thereon mounted mold of FIG. 3, FIG. 5 shows a side view of a complete glass forming machine according to the invention, and FIG. 6 shows a plan view of essential components of the glass forming machine of FIG. 5.

FIG. 1 shows a work station 1 for making a glass stem the contours of which correspond to the space 2 in a glass mold 3. The said work station 1 extends over part of the circumference of a machine table 4 which is designed after the manner of a carousel and has an upper, substantially circular ring-shaped surface 5.

The bottom side of machine table 4 contains a number of recesses 6 corresponding to the number of work stations, in which one bearing 7 each for a first piston-shaped vertical guidance element 8 is disposed. The said bearing 7 has a downward directed extension 9 with a diametral aperture 10 which is traversed by a sliding dog 11 with a steering surface 12. The said steering surface 12 acts on a steering surface 13 of a sliding block 14 the lower end of which is shaped like a fork, which over a not further identified screw is unturnably joined with the first vertical guidance element 8. By a transversl movement of sliding dog 11 a vertical movement of the vertical guidance element 8 corresponding to the steering surface 12 is produced. Driving means for the sliding dog 11 are known from the prior art and therefore not shown in the drawing. A rocker arm 15 prevents an accidental outward sliding of said sliding dog 11 during the rotation of the machine.

The vertical guidance element 8 has a hollow space 16 the upper end of which has a square-shaped aperture 17 into which, with a corresponding radial play, a complementarily shaped threaded bushing 18 is inserted so that its upper edge 19 floats on the upper front face of vertical guidance element 8. Both the outer surface of vertical guidance element 8 and the inner surface of bearing 7 constitute cyclindrical surfaces.

On threaded bushing 18 rests, in turn, a second vertical guidance element 20 with an outer cylindrical surface 21, a cylindrical bore 22 and a threaded bore 23 into which a threaded bolt 24 is inserted. The said threaded bolt, by means of a corresponding counterthread, penetrates also the said threaded bushing 18. The upper end of threaded bolt 24 is inserted by means of a not further identified diametral notched pin in a rod 25 the lower end of which has a cylindircal configuration and is inserted rotationally and longitudinally movable into the cylindrical bore 22 of vertical guidance element 20. By means of threaded bolt 24 the threaded bushing 18 and the second vertical guidance element 20 can be braced against one another. When the threaded joint is loosened by a left rotation of vertical guidance element 20 the rod 25 together with the threaded bolt 24 can be moved upward or downward. To that end, rod 25 has underneath its working surface 26 a surface 27 to be engaged by a screw spanner or the like. As soon as rod 25 is at the required height the said threaded joint can by a rightward turn of vertical guiadance element 20 be braced and/or locked. To that end, the vertical guidance element 20 has at its upper end surfaces 28 which are to be likewise engaged by a screw spanner or other adjusting tool.

The upper boundary surface 5 of machine table 4 has a recess 29 which is engaged by a complementary extension 30 of a bottom plate 31 which carries the exchangeable glass mold 3. The said glass mold consists in the present case of two parts and is fastened in a likewise two-part mold holder 32 of which only the rear half is shown. The mold holder has hinge means 33 and 34 which are alternately associated to one half each of said mold holder 32. The said hinge means are arranged on a bearing 35 which, in turn, is slid onto a hinge bolt 36.

In order to be able to center glass mold 3 exactly against rod 25 the bottom plate 31 has a centering means 37 which as hollow-cylindrical extension protrudes above the said bottom plate and at the junction with the said bottom plate has an annular groove 38 with a conical surface 39. The parts of mold holder 32 are at their lower edge designed complementary to the associated circumferential part of annular groove 38 with conical surface 39 so that with the closing of mold holder 32 an exact centering relative to axis A—A of the mold is assured. The hinge bolt 36 is by means of a formed on cylindrical piece 40 set into a corresponding bore 41 in bottom plate 31.

Bottom plate 31 and/or centering means 37 has a cylindrical bore 42 which houses vertical guidance element 20. Through this vertical guidance the said rod 25 can be longitudinally moved exactly within axis A—A of the mold by means of sliding dog 11. FIG. 1 illustrates the extremely compact and axially short structure of the two vertical guidance elements 8 and 20 which nevertheless are carried independently of each other by their associated bearing 7 and bore 42 respectively. After the mold holder 32 is opened the surfaces 27 and 28 for engagement by appropriate adjusting tools are exposed so that rod 25 can be adjusted in the manner described above. On the other hand, the bottom plate 31 together with the mold holder 32 and mold 3 can after loosening of screws (not shown) be removed and molds exchanged in this manner. After removal of mold holder 32, rod 25 with vertical guidance element 20 and threaded bushing 18 can be taken out at the top so that here, too, the same can be exchanged with the greatest of ease.

To lubricate the said vertical guidance elements 8 and 20, the bearing 7 contains a connection 43 for lubricants which, as can be seen, is likewise located underneath the machine table 4. The lubricants are distributed over a system of holes which are not further identified in the drawing.

The stems arriving from the machine according to FIG. 1 can be moved through a device in which they are fire polished and then, via a cooling belt, to a section in which they are stored for future use. To be subsequently joined with the corresponding cups the surface of engagement must be heated up again to the temperature at which the glass is in the plastic state once again.

FIG. 2 shows a one-piece glass mold 3a for making cups, wherein corresponding mold segments 44 are mounted in a one-piece rotation-symmetrical jacket 45. A mold holder 32a of similarly simple design is provided which essentially consists of an annular disk 46 and a downward directed supporting edge 47. The said supporting edge engages over a centering means 37 so as to assure an absolutely concentric alignment of axis A—A of the mold relative to the longitudinal axes of all vertical guidance elments which, at least with their outer surfaces, constitute pure bodies of rotation. The manner in which mold holder 32a is fastened on bottom plate 31 will be more fully explained on hand of FIGS. 3 and 4.

The rod 25 in the embodiment according to FIG. 2 has a slightly larger cross section and a differently shaped work surface 26, but otherwise agrees in its manner of operation with that of rod 25 in FIG. 1. Also, in the embodiment according to FIG. 2 the rod 25 is connected over a spring-loaded snap-in connection with an extension of threaded bolt 24. The other guiding and driving elements agree with those of FIG. 1 and thus identical reference numbers were used for the most important parts of the device to avoid repetition. It can be shown particularly on hand of FIG. 2 that the device according to the present invention can be changed over universally also without use of a special mold table.

FIG. 3 shows the manner in which the mold holder 32a with glass mold 3a is fastened on the bottom plate 31. To prevent a rotation of mold holder 32a relative to bottom plate 31 the latter contains a radial adjusting spring 48. The said mold holder 32a is fastened over two diametrally arranged clamping shoes 49 which are clamped over tension bolts 50 against bottom plate 31 and mold holder 32a respectively. According to FIG. 4, the plane of section shown in FIG. 3 runs along the line III—III.

FIG. 3 shows further that the bottom side of rod 25 has a bolt 51 which contains a circumferential groove 52 by means of which the said rod is engaged in an extension of threaded bolt 24 (FIG. 2).

Above each mold 3 or 3a a press die known from the prior art for forming a charge of glass into a stem or cup is provided.

The cups coming from the machine as shown in FIGS. 2 or 3 can be moved directly, possibly after fire-polishing, to a further machine where they are joined in the manner known per se with previously stored stems or with stems coming directly from another machine.

FIGS. 5 and 6 show a glass molding machine according to the invention in side view and in plan view. The machine table 4 contains a total of 16 stations 1 each of which contains a glass mold 3 with a holder 32 which is equipped with hinge means 33 and 34 as shown in FIG. 1 or the parts as shown in FIGS. 2 through 4.

The machine table 4 rests via an intermittent rotary drive 53 on a movable machine frame 54 on which also a clamping station 55, a press cylinder 56 with a lift measuring means 57 and a spring basket 58 are fastened. The various components are supported over a central column 59 and a radial traverse 60. On the opposite side the lift drive 61 is located which consists of a lift cylinder 62 and the aforedescribed sliding dog 11 which is driven by the said lift cylinder 62 over a not further identified piston rod and a dog 63.

This device has further a removal station 64 which is suspended on an arm 65. Each mold holder 32, if provided with hinge means 33 and 24 according to FIG. 1, has a closure drive 66 which is likewise fastened on machine table 4. FIG. 6 shows a two-part mold holder 32 in the opened position. Details of the press cylinder and/or press station and the removal station constitute state of the art and will therefore not be gone into at greater length.

FIG. 5 shows further that the glass molding machine according to the present invention has a substantial amount of free space above the machine table 4 which is not blocked by the mold tables used hitherto.

I claim:

1. Machine for making pressed glass parts with a surface for joining with a further glass part, and more particularly for making cups and stems, with a rotatable table (4) having several stations with one bottom plate (31) each with at least one centering means (37) for an exchangeably mountable mold (3, 3a), with one lift drive (61) each rotating with the machine table for a rod (25), said rod coacting with the said mold and forming the said joining surface and being slightly lowerable after the forming, with a first vertical guidance means (8) for the said lift drive mounted together with the latter in the said machine table and with a thereabove lying second vertical guidance means (20) for said rod mounted in the bottom plate (31), and with a means (23/24) for setting the vertical distance between rod and lift drive, said machine being characterized in that the first vertical guidance element (8) is mounted over its entire length underneath an upper boundary surface (5) of machine table (4) and inside the latter, and in that the bottom plate (31) with the second vertical guidance element (20) is mounted on the said machine table directly.

2. Machine as set forth in claim 1, being further characterized in that the first (8) and second (20) vertical guidance elements are, by way of a threaded bushing (18) which is unturnable relative to the first vertical guidance element (8), mounted upon one another in the area of the machine table (4), and in that a threaded bolt (24) which is unturnably joined with the rod (25) but is turnable relative to the second vertical guidance element (20) in a threaded bore (23) engages in the said threaded bushing (18) so that the second vertical guidance element (20) constitutes the counter nut for the said threaded bushing (18).

3. Machine as set forth in claim 2, being further characterized in that the rod (25) and the second vertical guidance element (20) below the working surface (26) of the said rod have surfaces of engagement (27, 28) for tools to be used for adjustment purposes.

4. Machine as set forth in claim 2, being further characterized in that said threaded bushing (18) is mounted with radial play into the first guidance element (8).

5. Machine as set forth in claim 1, being further characterized in that the bottom side of bottom plate (31) for the glass mold (3) has an extension (30) concentric with the mold axis A—A and the said machine table (4) has a recess (29) complementary to the said extension.

6. Machine as set forth in claim 1, being further characterized in that the first vertical guidance element (8) is mounted in a bearing (7) the upper front face of which lies at most in the upper boundary surface (5) of machine table (4).

7. Machine as set forth in claim 6, being further characterized in that the bearing (7) for the first vertical guidance element (8) is mounted at the machine table (4) from below, and in that the associated bottom plate (31) with the second vertical guidance element (20) is coaxially mounted at the said machine table (4) from above.

8. Machine as set forth in claim 6, being further characterized in that a connection (43) for lubricants for the said bearing (7) is provided below the machine table (4).

9. Machine as set forth in claim 1, being further characterized in that with a divided glass mold (3) the closure drive for the said glass mold is mounted likewise directly on the said machine table (4).

* * * * *